United States Patent [19]

Schmidt et al.

[11] 4,344,993

[45] Aug. 17, 1982

[54] PERFLUOROCARBON-POLYMERIC COATINGS HAVING LOW CRITICAL SURFACE TENSIONS

[75] Inventors: Donald L. Schmidt; Malcolm E. Pruitt, both of Midland, Mich.; Keith I. Dismuke, Baton Rouge, La.

[73] Assignee: The Dow Chemical Company, Midland, Mich.

[21] Appl. No.: 182,892

[22] Filed: Sep. 2, 1980

[51] Int. Cl.³ .................... B05D 7/22; B08B 17/02; B32B 1/02
[52] U.S. Cl. .................................. 428/35; 427/230; 427/236; 526/62; 525/150
[58] Field of Search ............... 427/230, 236; 428/35; 526/62; 525/1, 2, 3, 4, 5, 6

[56] References Cited

U.S. PATENT DOCUMENTS

| | | | |
|---|---|---|---|
| 3,172,910 | 3/1965 | Brace | 252/356 |
| 3,258,423 | 6/1966 | Tuve et al. | 252/3 |
| 3,825,434 | 7/1974 | Berens et al. | 427/239 |
| 3,849,179 | 11/1974 | Morningstar | 427/230 |
| 4,001,154 | 1/1977 | Schmidt | 260/29.4 UA |
| 4,007,320 | 2/1977 | Petersen | 526/62 |
| 4,111,914 | 9/1978 | Kresta et al. | 528/48 |

OTHER PUBLICATIONS

Advances in Chemistry Series #43, "Contact Angle, Wettability and Adhesion", pp. 20–22 (1964).

*Primary Examiner*—James R. Hoffman

[57] ABSTRACT

Coatings having very low critical surface tensions comprise (1) a hydrophilic polymer such as polyacrylamide, (2) an ionic perfluorocarbon compound such as 3-[((heptadecafluorooctyl)sulfonyl)amino]-N,N,N-trimethyl-1-propanaminium iodide and (3) a cyclic sulfonium zwitterion cross-linking agent such as 2,2-bis(3-tetrahydrothiophenium-4-oxidophenyl)-propylidene. Such coatings are most advantageously employed as release coatings on internal surfaces of chemical reaction vessels in order to minimize the deposition (build-up) of undesirable materials on such internal surfaces.

8 Claims, No Drawings

PERFLUOROCARBON-POLYMERIC COATINGS HAVING LOW CRITICAL SURFACE TENSIONS

BACKGROUND OF THE INVENTION

This invention relates to release coatings containing perfluorocarbon release agents and to processes for using such coatings to prevent deposition of undesirable materials on certain substrates.

A wide variety of chemical processes are commonly carried out in large, stirred vessels which are frequently provided with auxiliary equipment such as baffles and heat transfer coils which enable heat to be supplied or extracted from the contents of the vessels. In many cases, however, such processes eventually produce undesirable deposits on the surfaces of the equipment with which the reaction mixtures come into contact. Such deposits interfere with the efficient transfer of heat to and from the interior of the vessels. Sometimes, these deposits have a tendency to deteriorate and to partially fragment, resulting in contamination of the reaction mixture and the products produced therefrom. This problem is particularly prevalent in polymerization since the deposits or "build-up" of solid polymer on reactor surfaces, not only interferes with heat transfer, but decreases productivity and adversely affects polymer quality.

This problem of polymer "build-up" is particularly severe in the commercial production of olefin polymers such as polyethylene, polypropylene and copolymers of ethylene with other olefins such as propylene, 1-butene, 1-hexene and 1-octene as well as in the polymerization of many other ethylenically unsaturated monomers such as vinyl chloride, vinylidene chloride and similar monomers having a terminal ethylenic group. As an example of particular interest, linear ethylene polymers are produced commercially by contacting a monomer stream containing ethylene with a metal catalyst such as a Ziegler catalyst dispersed in liquid hydrocarbon. When such polymerizations are carried out under slurry conditions, the polymer is produced as a solid particulate which is dispersed or slurried in the liquid hydrocarbon by agitation. Unfortunately, such slurries or dispersions are inherently unstable; thus, during polymerization, ethylene polymer often builds up upon interior surfaces of the baffles and the agitator. This undesirable polymer deposit deleteriously affects heat transfer, polymer quality and productivity.

Accordingly, in the commercial practice of such polymerization processes, it is necessary to periodically stop the reaction and have production personnel enter the reactor and remove polymer deposits from reactor walls, baffles, agitator, etc. This cleaning operation is not only costly, both in labor and down-time of the reactor, but can be dangerous to the persons cleaning the reactor. While various methods, such as solvent cleaning, have been proposed heretobefore to reduce the amount of polymer build-up on polymerization reactor walls, none have been entirely satisfactory.

More recently, as disclosed in U.S. Pat. Nos. 3,825,434; 3,849,179 and 4,007,320, those skilled in the polymer arts have attempted to reduce polymer build-up on internal surfaces of the reactor by coating such internal surfaces with a hydrophilic polymer that is cross-linked to render it insoluble in the reaction medium. Unfortunately, these coatings often (1) do not adhere well to the metallic internal surfaces of the reactor, (2) deactivate metallic catalysts such as Ziegler catalysts and/or (3) do not have a critical surface tension low enough to effectively prevent polymer build-up.

Therefore, it is highly desirable to provide an improved coating and a process for using same which will significantly reduce the undesirable deposition of material on internal surfaces of reactors for a wide variety of chemical reactions.

SUMMARY OF THE INVENTION

In one aspect, the present invention is such a coating which comprises (1) a linear polymer containing a sufficient proportion of strong hydrogen bonding moieties to enable it to form a thermodynamically stable solution in water at least a 0.5 weight percent concentration (hereinafter said polymer shall be called "hydrophilic polymer"); (2) a cyclic sulfonium zwitterion capable of cross-linking the hydrophilic polymer (hereinafter called a "zwitterion"); and (3) a perfluorocarbon compound having a $-CF_3$ group and a group with potentially ionic character (hereinafter called an "ionic perfluorocarbon"). The proportions of the hydrophilic polymer and the perfluorocarbon are such that the resulting coating has a critical surface tension of wetting less than 15 dynes per centimeter (dynes/cm). The concentration of zwitterion is sufficient to cross-link the composition to an adherent, nonreactive, insoluble coating. Surprisingly, the combination of the hydrophilic polymer and the perfluorocarbon in the coating of this invention provides a surface having a critical surface tension less than that of a coating consisting entirely of the perfluorocarbon.

The coatings of this invention are particularly useful in reducing build-up of undesirable material, polymer or otherwise, on internal surfaces of reaction vessels as well as internal surfaces of chemical storage and transfer vessels. Accordingly, in another aspect, this invention is such a process for reducing build-up which comprises applying the aforementioned coating to the internal surfaces of a reaction vessel and converting same to cross-linked form before carrying out the desired chemical reaction. Such process is advantageously employed in polymerization of aliphatic α-olefins such as ethylene, propylene, butene-1 or mixtures thereof as well as in the polymerization of other ethylenically unsaturated monomers such as vinyl chloride, vinylidene chloride and the like. In addition, such a process may be employed in a wide variety of other chemical processes, especially those wherein the deposition of organic materials on internal surfaces of reactor equipment is a problem.

DETAILED DESCRIPTION OF THE INVENTION

Hydrophilic polymers suitably employed in the practice of this invention are those (1) which can be cast as an adherent coating on a substrate and (2) which contain a proportion of strong hydrogen bonding moieties sufficient to enable it to form a thermodynamically stable solution in water at a concentration of 0.5 weight percent. Preferably, the hydrophilic polymer will form at least a one percent aqueous solution and will swell in water, i.e., will absorb at least 20 weight percent of water. In addition, the hydrophilic polymer can be rendered insoluble in water and hydrocarbon solvents by reaction with the cyclic sulfonium zwitterion. Suitable hydrophilic polymers include polymers of ethylenically unsaturated carboxamides such as acrylamide and methacrylamide; sulfoalkyl esters of ethylenically unsaturated carboxylic acids such as 2-sulfoethyl methacrylate; ethylenically unsaturated carboxamido alkyl sulfonic acids such as 2-acrylamido-2-methylpropane sulphonic acid; quaternary ammonium monomers such as N-(3-(trimethylammonium)propyl)methacrylamide and other ethylenically unsaturated monomers that are water-soluble and have at least one moiety that exhibits hydrogen bonding character as defined by Pimental and McClellan, "The Hydrogen Bond," W. H. Freeman and Company, San Francisco (1960). Preferred hydrophilic polymers are ethylenically unsaturated carboxamide polymers, with polyacrylamide and copolymers of acrylamide with 2-acrylamido-2-methylpropane sulfonic acid or salt thereof being most preferred.

Cyclic sulfonium zwitterions beneficially employed in the practice of this invention are ar-cyclic sulfonium areneides, which react with the hydrophilic polymer to form a water- and hydrocarbon-insoluble solid which will adhere to metal surfaces. Such zwitterions contain at least two cyclic sulfonium moieties and at least 2 anionic moieties wherein both the anion and sulfonium moieties are bonded to an aromatic ring. Preferred ar-cyclic sulfonium areneides are represented by the formula:

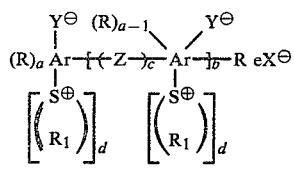

wherein each Ar is individually a cyclic aromatic polyyl; Y is $-S^{\ominus}$ or $-O^{\ominus}$; each R is independently a suitably inert monovalent radical capable of existing as a ring substituent on Ar; each $R_1$ is independently a suitably inert divalent organic radical capable of forming a heterocyclic ring containing sulfur; each Z is independently a suitably inert divalent radical bridging the substituted Ar groups; X is a neutralizing anion; each a is independently a positive number corresponding to the number of remaining available ring positions on Ar; b is a positive number, preferably 1 to 3; c is 0 or 1; each 3 is independently 1 or 2 and e is a number such that the salt molecule is electrically neutral.

For the purposes of this invention, the term "aromatic polyyl" means a polyvalent (more than one) aromatic radical having at least one aromatic carbocyclic ring. For example, benzene, as a polyyl, has a maximum valence of six, the maximum valence of the anthracene polyyl is ten. By a "suitably inert radical" is meant a radical that (1) is inert to the cyclic sulfonium moiety and the mercapto or arene sulfide moiety and (2) does not prevent polymerization of the zwitterion of the aforementioned salt through the cyclic sulfonium moiety.

Most preferred are the ar-cyclic sulfonium areneoxides wherein Ar is a benzene or naphthalene polyyl, especially a benzene polyyl; y is $-O^{\ominus}$; Z is alkylene, especially alkylidene having 1 to 3 carbons or oxyalkyleneoxy; R is hydrogen or lower alkyl such as methyl, especially hydrogen; $R_1$ is alkylene having 4 or 5 carbons, especially 4 carbons; a is 3; b is 1; c is 1; d is 1 and e is 0.

Examples of preferred zwitterions and methods for their preparation are described in U.S. Pat. Nos. 3,660,431; 3,749,737; 3,749,738; 3,749,739; 4,130,543 and 4,118,297. Of these examples, the following compounds are most preferred:

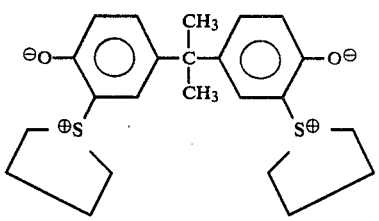

1,1'-[isopropylidenebis(4-oxido-3,1-phenylene)]bis(tetrahydrothiophenium),

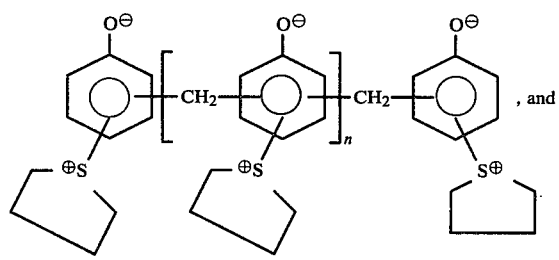, and

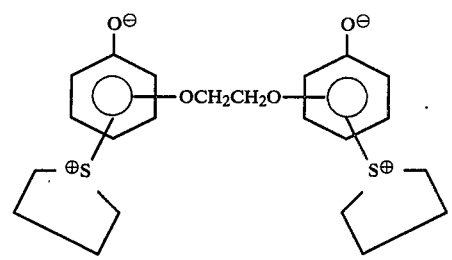

Ionic perfluorocarbons suitably employed in the practice of this invention include organic compounds represented by the formula:

$$R_fZ$$

wherein $R_f$ is a saturated fluoroaliphatic moiety containing a $F_3C-$ moiety and Z is a ionic moiety or potentially ionic moiety. The fluoroaliphatic moiety advantageously contains 3 to 20 carbons wherein substantially all are fully fluorinated, preferably from about 3 to about 10 of such carbons. This fluoroaliphatic moiety may be linear, branched or cyclic, preferably linear, and may contain an occasional carbon-bonded hydrogen or halogen other than fluorine, and may contain a divalent sulfur or oxygen atom or a trivalent nitrogen atom bonded only to carbon atoms in the skeletal chain. More preferred are those linear perfluoroaliphatic moieties represented by the formula:

$$C_nF_{2n+1}$$

wherein n is 5 to 10. Ionic or potentially ionic moieties advantageously include those represented by the formulae:

$$-SO_2NR'N^{\oplus}(R'')_3X^{\ominus}, \quad -CONR'N^{\oplus}(R'')_3X^{\ominus},$$
$$\quad\quad\quad | \quad\quad\quad\quad\quad\quad\quad\quad\quad | $$
$$\quad\quad\quad R \quad\quad\quad\quad\quad\quad\quad\quad\quad R$$

-continued

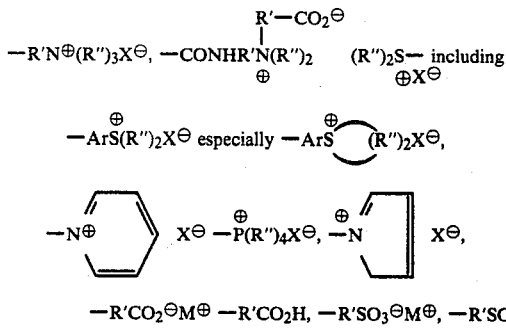

—R'CO$_2^\ominus$M$^\oplus$ —R'CO$_2$H, —R'SO$_3^\ominus$M$^\oplus$, —R'SO$_3$H wherein:
R is hydrogen or hydrocarbyl such as lower alkyl having 1–3 carbons;
R' is hydrocarbylene or oxyhydrocarbylene such as alkylene having 1 to 6 carbons, arylene, oxyarylene, aralkylene or similar divalent hydrocarbon or oxyhydrocarbon moiety;
each R" is individually hydrogen, hydrocarbyl such as lower alkyl having 1 to 5 carbons or hydroxyhydrocarbyl; and
X$^\ominus$ is an anion, especially an inorganic anion such as halide, sulfate or carboxylate such as acetate; and
M$^\oplus$ is a cation such as an alkali metal cation or ammonium.

When nonionic or anionic hydrophilic polymers are employed, the ionic perfluorocarbon is a cationic perfluorocarbon, especially 3-[((heptadecylfluorooctyl)sulfonyl)amino]-N,N,N-trimethyl-1-propanaminium iodide; 3-[((heptadecylfluorooctyl)carbonyl)amino]-N,N,N-trimethyl-1-propanaminium chloride, and a cationic perfluorocarbon sold by duPont under the tradename Zonyl® FSC. Examples of other preferred cationic perfluorocarbons, as well as methods of preparation, are those listed in U.S. Pat. No. 3,775,126.

When the hydrophilic polymer is cationic, the ionic perfluorocarbon is an anionic or amphoteric perfluorocarbon, especially perfluorooctanoic acid, perfluorooctyl sulfonic acid, an anionic perfluorocarbon or an amphoteric perfluorocarbon sold by duPont under the tradename Zonyl® FSA or Zonyl® FSB, respectively. Examples of other preferred anionic perfluorocarbons, as well as methods of preparation, are illustrated in U.S. Pat. No. 3,172,910.

In the preparation of the release coatings of the present invention, the hydrophilic polymer, cyclic sulfonium zwitterion and cationic perfluorocarbon are formulated in proportions such that a coating cast from the formulation cures to a solid film that (1) is insoluble in hydrocarbon and water, (2) is inert to any reagents which will contact the coating in subsequent use and (3) has a critical surface tension less than 15 dynes/cm; preferably less than 14 dynes/cm. Preferred coating formulations typically contain from about 70 to about 90, especially from about 80 to about 85, weight percent of hydrophilic polymer; from about 30 to about 10, especially from about 20 to about 15, weight percent of cyclic sulfonium zwitterion and from about 0.05 to about 0.5, especially from about 0.15 to about 0.3, weight percent of ionic perfluorocarbon wherein said percentages are based on the total dry weight of the hydrophilic polymer, cyclic sulfonium zwitterion and cationic perfluorocarbon. The coatings are usually formulated in a liquid that is a solvent for each of the three components. Typically, such solvents are water; alkanols, e.g., ethanol, 2-propanol and 1-butanol; and mixtures of alkanols with water. Where such solvents are employed, the coating formulations preferably contain from about 1 to about 10, most preferably from about 3 to about 5, weight percent of solids (i.e., total weight of hydrophilic polymer, zwitterion and perfluorocarbon).

In the preferred uses of the coatings of this invention, the aforementioned coating formulation is applied to the inner surfaces of a chemical reaction vessel wherein the reaction of organic chemicals is carried out. Examples of such organic chemical reactions include the addition polymerization of vinyl monomers such as ethylene, propylene and other aliphatic olefins; vinyl and vinylidene chloride; or vinyl aromatics such as styrene. Other chemical reactions in which the coatings of this invention may be usefully employed include chlorination of polyethylene, and the production of salicylic acid. Of the aforementioned chemical reactions, the coating of this invention is most advantageously applied to the internal surfaces of reactors used in the Ziegler polymerization of ethylene and other α-olefins such as propylene and butene-1, e.g., under Ziegler conditions as described in U.S. Pat. Nos. 3,907,760 and 4,172,050.

Accordingly, the coating may be applied directly (i.e., without the prior application of a primer coating) to the interior surfaces of the reaction vessel in any convenient manner, such as spraying, brushing on, and the like. Brushing has been found to be satisfactory since it insures complete coverage of all surfaces. Any uncovered areas, such as pinholes, etc., should be avoided since such exposed areas provide sites for polymer build-up. More than one layer of the coating may be applied to insure complete coverage. The amount of coating applied or the thickness thereof is not particularly critical so long as a continuous film over all interior surfaces of the reaction vessel is provided. In addition to coating the interior surfaces or walls of the reaction vessel, all other parts therein should likewise be coated, such as baffles, agitator shaft and blades, heating coils, temperature probes and the like. In some instances, it may be preferable to pretreat the internal surfaces of the reaction vessel with conventional chemical coupling agents. For example, prehydrolyzed silane coupling agents such as

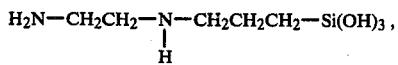

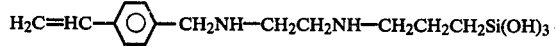

and the like are particularly useful for this purpose. Also, it is often desirable to precoat the internal surfaces with the hydrophilic polymer and zwitterion and then apply the remaining component, i.e., the perfluorocarbon, to the cured coating of hydrophilic polymer and zwitterion.

Following the application of the coating of the interior surfaces of the reaction vessel including product transfer conduits, dump lines, etc., the coating is heated in order to dry and cure the same. Any suitable heating method may be employed, such as radiant heating, heated air, and the like. Usually, temperatures within the range of 90° to about 160° C. are sufficient; with temperatures in the range of 110° to 130° C. being preferred. The temperature chosen will depend upon the time of drying. Thereafter, the reaction to be carried out in the equipment may be commenced immediately. No particular modifications of processing techniques are required due to the presence of the coating. Further, utilization of the internally coated reaction vessel of the present invention does not adversely affect the heat stability or other physical and chemical properties of the polymers or other reaction products produced therein. Ordinary care should, of course, be exercised to avoid abrading or rupturing the coating.

The following examples are illustrative embodiments of this invention and should not be construed as limiting its scope. Unless otherwise indicated, all parts and percentages are by weight.

EXAMPLE 1

Coating Formulation

A coating formulation is prepared by mixing 70 g of an aqueous solution of 19.5 percent polyacrylamide (0.5 percent hydrolysis and number average molecular weight, $M_n$ of 200,000), 10.0 g of an aqueous solution of 34.3 percent 1,1'-[isopropylidenebis(4-oxido-3,1-phenylene)]bis(tetrahydrothiophenium),

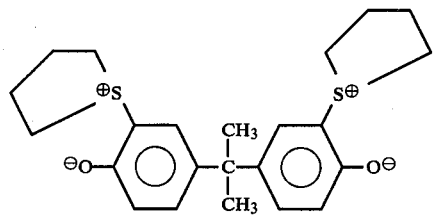

and 4.0 g of a solution of 1 percent 3-[((heptadecafluorooctyl)sulfonyl)amino]-N,N,N-trimethyl-1-propanaminium iodide, $CF_3(CF_2)_7SO_2NHCH_2CH_2CH_2N^{\oplus}(CH_3)_3I^{\ominus}$, in 75/25 isopropanol/water which is adjusted to pH of 9 with $NH_4OH$. To the resultant mixture are added, in succession, a mixture of 304 g of water and 41 g of isopropyl alcohol.

Application of the Coating

The aforementioned coating formulation is applied to a metal cylinder by dipping the cylinder into the aforementioned coating formulation. The coating thickness is approximately 24 mm over the exposed surfaces of the cylinder. The resulting coating is dried at 120° C. for 60 minutes.

Polymerization

The resulting coated cylinder is weighed and then suspended in a polymerization vessel as described in U.S. Pat. No. 4,172,050. Ethylene is polymerized in the reactor under slurry polymerization conditions as described in said U.S. patent. The coated cylinder is removed and weighed. The rate of build-up is found to be $2.4 \times 10^{-5}$ g of polymer deposited on the cylinder per gram of polyethylene per hour of polymerization time (g BU/g PE/hr).

In contrast, when an uncoated cylinder is similarly suspended in the polymerization vessel, the rate of build-up on the uncoated cylinder is found to be $1.1 \times 10^{-3}$ g BU/g PE/hr or about 46 times the rate of build-up on the coated cylinder.

In a subsequent polymerization run carried out in the preceding manner except that the cylinder is coated with a formulation containing a polyacrylamide having 7 percent hydrolysis as the hydrophilic polymer, the rate of build-up is approximately the same as on an uncoated cylinder. Accordingly, it is understood that the coating formulation being used in a Ziegler polymerization vessel should not contain an appreciable amount of carboxylic acid moiety or other moiety which reacts with the Ziegler catalyst.

EXAMPLE 2

Following the procedure of Example 1, a coating formulation is prepared which contains 100 parts of acrylamide/2-acrylamido-2-methylpropanesulfonic acid, 20 parts of the zwitterion used in Example 1 and 0.1 part of the perfluorocarbon of Example 1. This formulation is applied to a metal cylinder, cured and tested for release character using the procedures described in Example 1. The rate of build-up is $2.2 \times 10^{-6}$ gBu/gPE/hr, which is 1/61 of the rate for an uncoated cylinder.

What is claimed is:

1. A coating composition comprising (1) a linear hydrophilic polymer, (2) a cyclic sulfonium zwitterion capable of cross-linking the hydrophilic polymer and (3) a perfluorocarbon having a —$CF_3$ group and an ionic or potentially ionic group, said zwitterion being present in an amount sufficient to cross-link the composition to an adherent, nonreactive coating that is insoluble in water and hydrocarbon, said hydrophilic polymer and perfluorocarbon being present in amounts such that the coating has a critical surface tension of wetting less than 15 dynes/cm.

2. The composition of claim 1 which comprises from about 70 to about 90 weight percent of an acrylamide polymer, from about 10 to about 30 weight percent of the cyclic sulfonium zwitterion represented by the formula:

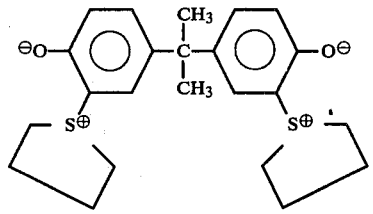

and from about 0.05 to about 0.5 weight percent of 3-[((heptadecylfluorooctyl)sulfonyl)amino]-N,N,N-trimethyl-1-propanaminium chloride, said percentages being based on the total dry weight of the polymer, zwitterion and perfluorocarbon.

3. A coated substrate wherein the coating for the substrate results from cross-linking the composition of claim 1.

4. A chemical reaction vessel having its internal surfaces covered with the coating of claim 3.

5. A chemical reaction vessel having its internal surfaces covered with the coating of claim 3 which is a vessel used in the polymerization of an α-olefin at slurry polymerization temperatures in the presence of a Ziegler catalyst.

6. A process for reducing the deposition of polymer on the internal surfaces of a polymerization vessel used in the polymerization of ethylenically unsaturated polymerizable compounds which comprises (1) applying the coating composition of claim 1 to at least a portion of the internal surfaces of the vessel and (2) converting the composition to an adhesive, nonreactive coating that is insoluble in water and hydrocarbon.

7. A process for reducing the deposition of polymer on the internal surfaces of a polymerization vessel used in the polymerization of ethylenically unsaturated polymerizable compounds which comprises (1) applying a coating of a linear hydrophilic polymer then (2) applying a coating comprising a cyclic sulfonium zwitterion capable of cross-linking the hydrophilic polymer and a perfluorocarbon having a —$CF_3$ group and an ionic or potentially ionic group, said coatings being applied in such proportions that (a) the zwitterion is present in an amount sufficient to cross-link the coatings to a single adherent nonreactive coating that is insoluble in water and hydrocarbons and (b) said hydrophilic polymer and perfluorocarbon are present in amounts such that said single adherent nonreactive coating has a critical surface tension of wetting less than 15 dynes/cm, and then (3) converting the coatings to an adhesive, nonreactive coating that is insoluble in water and hydrocarbon.

8. The coating composition of claim 1 wherein the linear hydrophilic polymer is a polymer of an ethylenically unsaturated monomer.

* * * * *